United States Patent [19]

Romstadt

[11] Patent Number: 5,706,196
[45] Date of Patent: Jan. 6, 1998

[54] METHOD AND APPARATUS FOR DETERMINING THE VELOCITY OF A VEHICLE BODY

[75] Inventor: Douglas J. Romstadt, Northwood, Ohio

[73] Assignee: Monroe Auto Equipment Co., Monroe, Mich.

[21] Appl. No.: 689,189

[22] Filed: Aug. 5, 1996

Related U.S. Application Data

[63] Continuation of Ser. No. 73,459, Jun. 7, 1993, abandoned.

[51] Int. Cl.⁶ .................................................. B60G 17/015
[52] U.S. Cl. ........................... 364/424.046; 364/424.047; 280/707
[58] Field of Search ...................... 364/424.046, 424.047, 364/426.01, 426.027, 426.036, 426.037, 571.01, 571.02, 571.05; 280/707, 840

[56] References Cited

U.S. PATENT DOCUMENTS

| | | | |
|---|---|---|---|
| 4,867,475 | 9/1989 | Groves | 280/707 |
| 4,881,172 | 11/1989 | Miller | 364/424.05 |
| 4,888,696 | 12/1989 | Akatsu et al. | 364/424.05 |
| 4,897,776 | 1/1990 | Urababa et al. | 364/424.05 |
| 5,016,908 | 5/1991 | Athanas et al. | 280/707 |
| 5,020,825 | 6/1991 | Lizell | 280/707 |
| 5,033,770 | 7/1991 | Kamimura et al. | 364/424.047 |
| 5,097,419 | 3/1992 | Lizell | 364/424.05 |
| 5,136,513 | 8/1992 | Sol et al. | 364/424.05 |
| 5,276,621 | 1/1994 | Henry et al. | 364/424.05 |
| 5,295,074 | 3/1994 | Williams | 364/424.05 |
| 5,515,277 | 5/1996 | Mine | 364/424.046 |
| 5,519,611 | 5/1996 | Tagawa et al. | 364/424.046 |

*Primary Examiner*—Kevin J. Teska
*Assistant Examiner*—Tyrone V. Walker
*Attorney, Agent, or Firm*—Harness, Dickey & Pierce

[57] ABSTRACT

An adjustable damping system (26) for an automotive vehicle (12) having a damper (10) and sensors (28, 30, 32) for determining the movement of the automotive vehicle (12) and generating a signal representing the movement of the automotive vehicle (12). The adjustable damping system (26) further includes a damper control logic unit 40 for automatically adjusting the damping characteristics of the damper (10) in response to the signal. The adjustable damping system (26) further includes a signal compensation unit (42) which is able to improve the accuracy with which signals representing the movement of the automotive vehicle (12) are determined.

1 Claim, 3 Drawing Sheets

METHOD AND APPARATUS FOR DETERMINING THE VELOCITY OF A VEHICLE BODY

This is a continuation of U.S. patent application Ser. No. 08/073,459, filed Jun. 7, 1993 which has been expressly abandoned.

BACKGROUND OF THE INVENTION

1. Field of the Invention

This invention relates to suspension systems for automotive vehicles and other bodies which receive mechanical shock, and more particularly to a method and apparatus for determining the velocity of a vehicle body.

2. Description of Related Art

Dampers are used in connection with automotive suspension systems to absorb unwanted vibrations which occur during driving. To absorb unwanted vibrations, dampers are generally connected between the body and the suspension of the automotive vehicle. A piston is located within the damper and is connected to the body of the automotive vehicle through a piston rod. Because the piston is able to limit the flow of damping fluid within the working chamber of the damper when the damper is compressed or extended, the damper is able to produce a damping force which counteracts the vibration which would otherwise be transmitted from the suspension to the body. The greater the degree to which the flow of damping fluid within the working chamber is restricted by the piston, the greater the damping forces which are generated by the damper.

In selecting the amount of damping that a damper is to provide, three vehicle performance characteristics are often considered: ride comfort, vehicle handling and road holding ability. Ride comfort is often a function of the spring constant of the main springs of the vehicle, as well as the spring constant of the seat, tires, and the damper. Vehicle handling is related to the variation in the vehicle's attitude (i.e., heave, pitch and roll). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

Because different driving characteristics are often a function of the amount of damping forces the dampers provide, it is often desirable to have a damper in which the amount of damping forces generated by the damper is adjustable. One method for selectively changing the damping characteristics of a damper is described in U.S. Pat. No. 4,867,475. In the system described in this reference, the flow of damping fluid between the upper and lower portions of the working chamber is controlled by a rotary valve which can quickly change the damping characteristics of the damper. Other methods for adjusting the damping characteristics of an automotive vehicle are described in U.S. Pat. Nos. 5,020,825 and 5,016,908. Such methods for adjusting the damping forces generated by the dampers often use accelerometers to sense the vertical movement of various portions of the automotive vehicle.

While these methods of adjusting the damping characteristics of an automotive vehicle are able to adequately provide adjustable damping, they are susceptible to certain improvements. For example, it may be useful to provide a method for improving the accuracy of which the accelerometers of the adjustable damping system are able to sense the vertical movement of the automotive vehicle. In this regard, the accelerometers which are used for estimating vertical movement of the automotive vehicle may also generate velocity components which do not necessarily reflect vertical movement. In addition, it may also be useful to have the damping characteristics of the automotive vehicle adjusted to independently compensate for changes in both roll and pitch.

SUMMARY OF THE INVENTION

Accordingly, an object of the present invention is to provide a method and apparatus for determining the velocity of the body of an automotive vehicle.

A further object of the present invention is to improve the accuracy with which an adjustable damping system is able to measure the vertical velocity of the body of an automotive vehicle.

A further object of the present invention is to provide an adjustable suspension system in which the damping characteristics of an automobile are adjusted in response to the roll of the automotive vehicle.

A related object of the present invention is to provide an adjustable damping system in which the damping characteristics are adjusted in response to the pitch of the automotive vehicle.

An additional object of the present invention is to provide an adjustable damping system which is able to provide improved vehicle handling capability.

Another object of the present invention is to provide a method and apparatus for determining the velocity of a vehicle body which is relatively simple and low in cost.

In one embodiment, the present invention includes a damper as well as means for determining the movement of the automotive vehicle and generating a signal representing the movement of the automotive vehicle. In addition, the present invention includes means for automatically adjusting the damping characteristics of the damper in response to the signal. The means for automatically adjusting the damping characteristics of the damper include means for improving the accuracy with which this signal represents the movement of the automotive vehicle.

In another embodiment, the present invention is able to adjust the damping characteristics of the automotive vehicle in response to the pitch of the automotive vehicle. In yet another embodiment, the present invention is able to adjust the damping characteristics of an automotive vehicle in response to the roll of the automotive vehicle.

BRIEF DESCRIPTION OF THE DRAWINGS

Various advantages of the present invention will become apparent to one skilled in the art upon reading the following specification and by reference to the following drawings in which.

DESCRIPTION OF THE PREFERRED EMBODIMENTS

The following description of the preferred embodiment of the present invention is merely exemplary in nature and is in no way intended to limit the invention or its application or uses.

Figure 1:
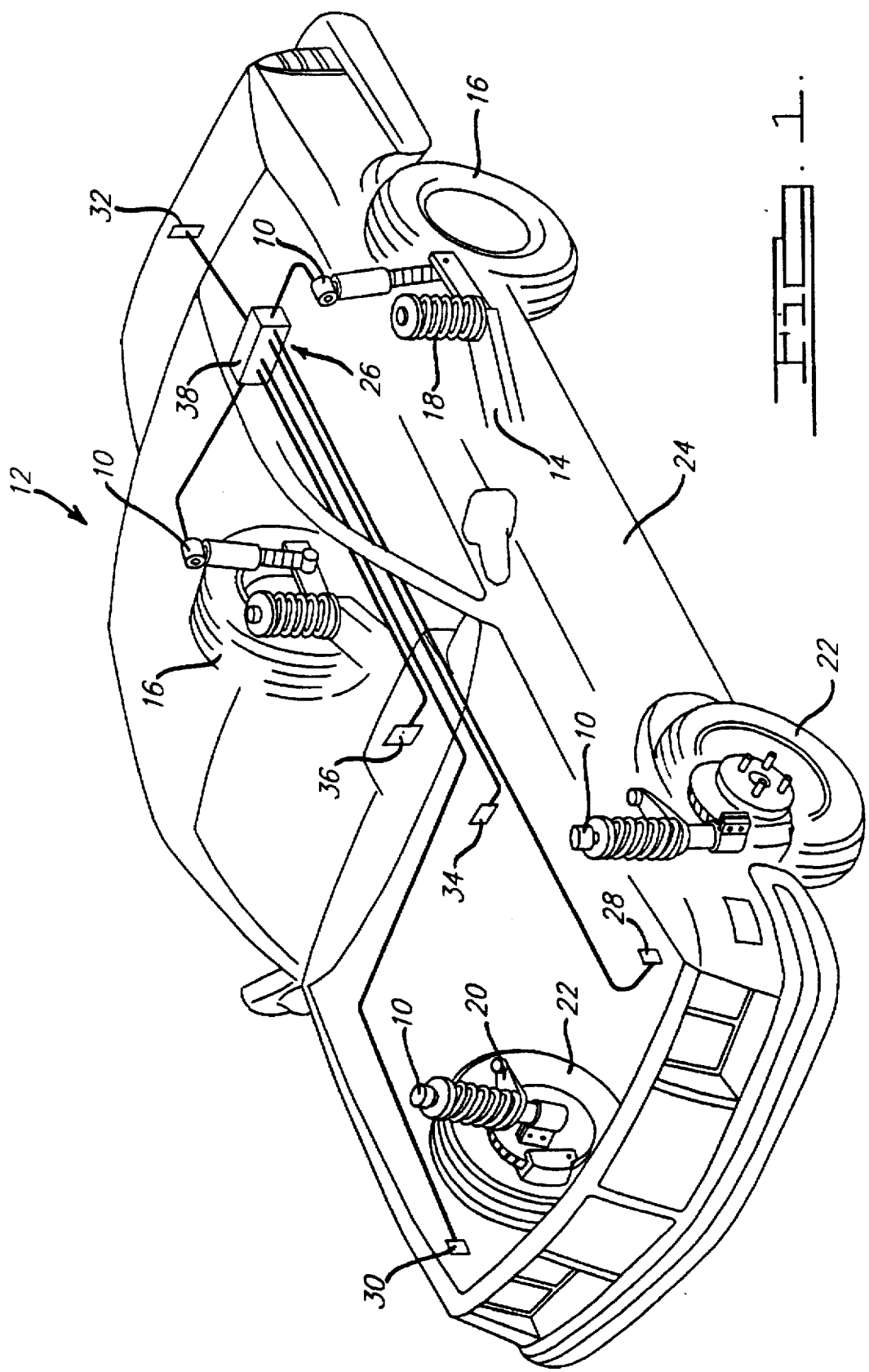
FIG. 1 is an illustration of an automotive vehicle using the method and apparatus for determining the velocity of a vehicle body according to the teachings of the preferred embodiment of the present invention.

Referring to FIG. 1, a plurality of dampers 10 according to the preferred embodiment of the present invention are shown. The dampers 10 are depicted in operative association with a diagrammatic representation of a conventional automotive vehicle 12. The automotive vehicle 12 includes a rear suspension system 14 having a transversely extending rear axle assembly (not shown) adapted to operatively support the vehicle's rear wheels 16. The rear axle assembly is operatively connected to the automotive vehicle 12 by means of a pair of dampers 10 as well as by the helical coil springs 18. Similarly, the automotive vehicle 12 has a front suspension system 20 including a transversely extending front axle assembly (not shown) to operatively support the front wheels 22. The front axle assembly is operatively connected to the automotive vehicle 12 by means of a second pair of dampers 10. The dampers 10 serve to damp the relative movement of the unsprung portion (i.e., the front and rear suspension systems 20 and 14) and the sprung portion (i.e., the body 24) of the automotive vehicle 12.

While the automotive vehicle 12 has been depicted as a passenger car, the dampers 10 may be used with other types of automotive vehicles or in other types of applications. In addition, the dampers 10 may be any suitable electronically adjustable damper such as those which are disclosed in U.S. Pat. Nos. 4,867,475 and 5,016,908 which are hereby incorporated by reference. Further, the term "damper" as used herein will refer to dampers in general and will include MacPherson struts and shock absorbers.

To provide means for automatically adjusting the damping characteristics of the dampers 10, the automotive vehicle further comprises an adjustable damping system 26. The adjustable damping system 26 is used for controlling the operation of each of the dampers 10 so as to provide the appropriate damping characteristics depending on the movement of the body 24 of the automotive vehicle 12. In this regard, the adjustable damping system 26 determines the movement of the body 24 of the automotive vehicle 12 and determines whether the movement exceeds certain thresholds. If the thresholds are exceeded, the adjustable damping system 26 causes the dampers 10 to change damping characteristics.

To provide means for determining the movement of the automotive vehicle 12, the adjustable damping system 26 comprises a left-front accelerometer 28, a right-front accelerometer 30 and a center-rear accelerometer 32. The left-front accelerometer 28 is disposed proximate to the damper 10 associated with the left-front portion of the automotive vehicle 12. In a similar fashion, the right-front accelerometer 30 is located near the damper 10 associated with the right-portion of the automotive vehicle 12. Finally, the center-rear accelerometer 32 is located centrally in the rear portion of the automotive vehicle 12. The accelerometers 28–32 may be a part No. 484-950-021 manufactured by Bosch, though other suitable accelerometers may be used. As will be appreciated by those skilled in the art, each of the accelerometers 28–32 may be connected to an anti-aliasing filter, an amplifier and/or analog-to-digital converter, all of which are not shown. Alternatively, these components may be located within the accelerometer packaging.

The adjustable damping system 26 further includes a longitudinal speed sensor 34 and a lateral acceleration sensor 36. The longitudinal speed sensor 34 is used for sensing the longitudinal speed of the automotive vehicle 12. In this regard, the longitudinal speed sensor 34 may be the sensor which is used to generate signals from the odometer of the automotive vehicle 12. The lateral acceleration sensor 36 is mounted near the center of gravity of the automotive vehicle 12 and used to sense the lateral acceleration of the automotive vehicle 12. It is to be understood that other means for sensing the longitudinal speed of the automobile as well as the lateral acceleration of the automotive vehicle 12 may be used.

Figure 2:
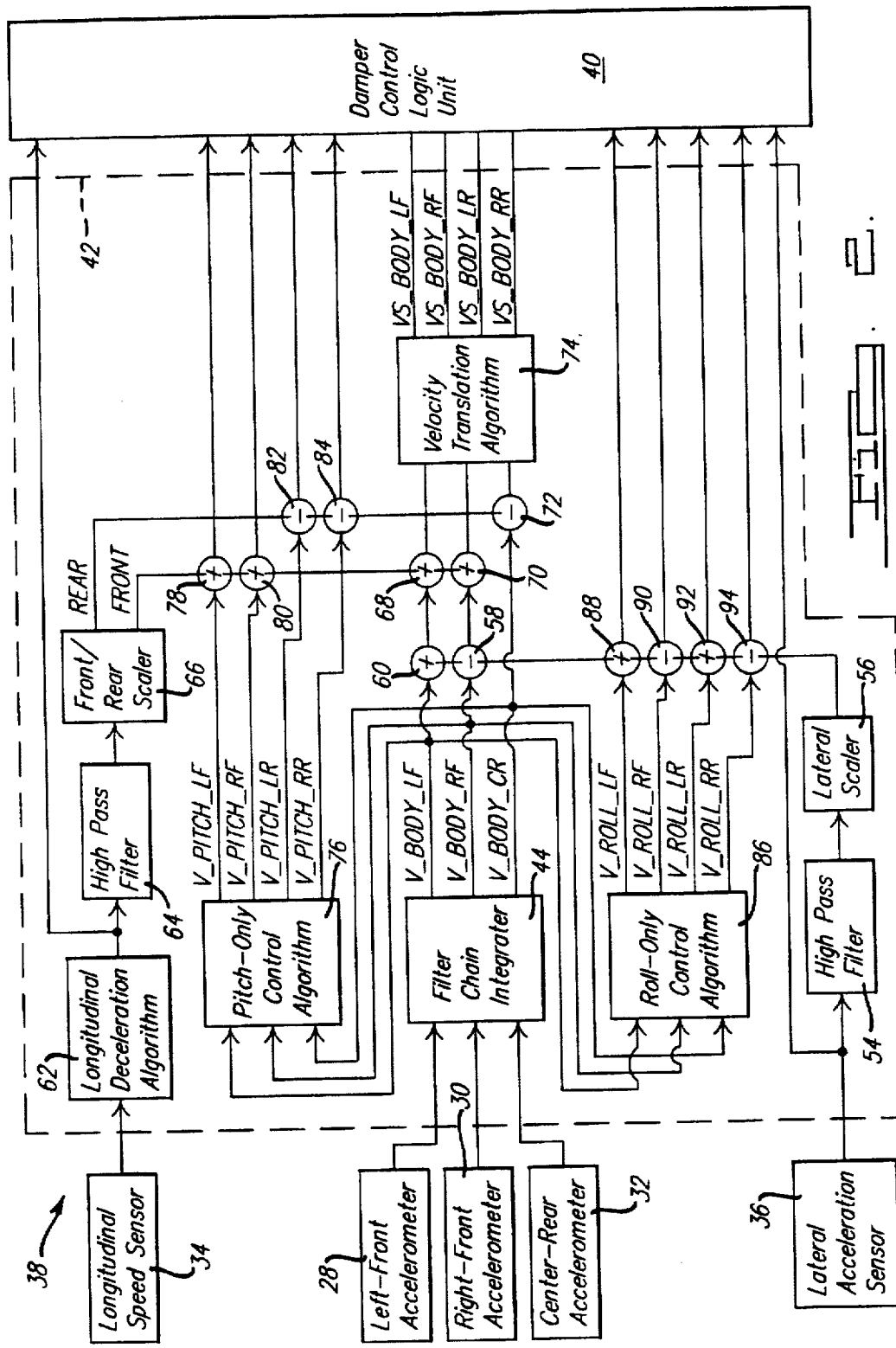
FIG. 2 is the schematic representation of the electronic control module shown in FIG. 1 according to the teachings of the preferred embodiment of the present invention.

The adjustable damping system 26 further includes an electronic control module 38 shown in FIG. 2. The electronic control module 38 receives the outputs of the accelerometers 28–32 as well as the longitudinal speed sensor 34 and the lateral acceleration sensor 36. The electronic control module 38 comprises a damper control logic unit 40 which is used to adjust the damping characteristics of the dampers 10 in response to the signals delivered to the damper control logic unit 40 from a signal compensation unit described below. In this regard, the damper control logic unit 40 determines whether the signals representative of the vehicle velocity at various portions of the automotive vehicle 12 exceeds certain thresholds and then adjust the damping characteristics of the dampers 10 in response to whether or not the signals exceed these thresholds. The damper control logic unit 40 may be of any type of damper control unit. For example, the damper control logic unit 40 may be similar to that which is disclosed in U.S. Pat. Nos. 5,020,825 and 5,016,908. However, other suitable damper control logic units may be used.

To provide means for improving the accuracy with which vertical body velocity is determined, the electronic control module 38 further comprises a signal compensation unit 42. The signal compensation unit 42 is used to improve the accuracy with which the electronic control module 38 determines the velocity of the automotive vehicle 12. To do so, the signal compensation unit 42 receives the output of left-front accelerometer 28, the right-front accelerometer 30 as well as the center-rear accelerometer 32. After determining the velocity of various portions of the automotive vehicle 12 from the output of the accelerometers 28–32, the signal compensation unit 42 adds and/or subtracts signals which are responsive to the outputs of the longitudinal speed sensor 34 as well as the lateral speed acceleration 36 in a manner more fully described below. The resulting output of the signal compensation unit 42 which more accurately represents the body velocity of the automotive vehicle 12, is then delivered to the damper control logic unit 40.

Figure 3:
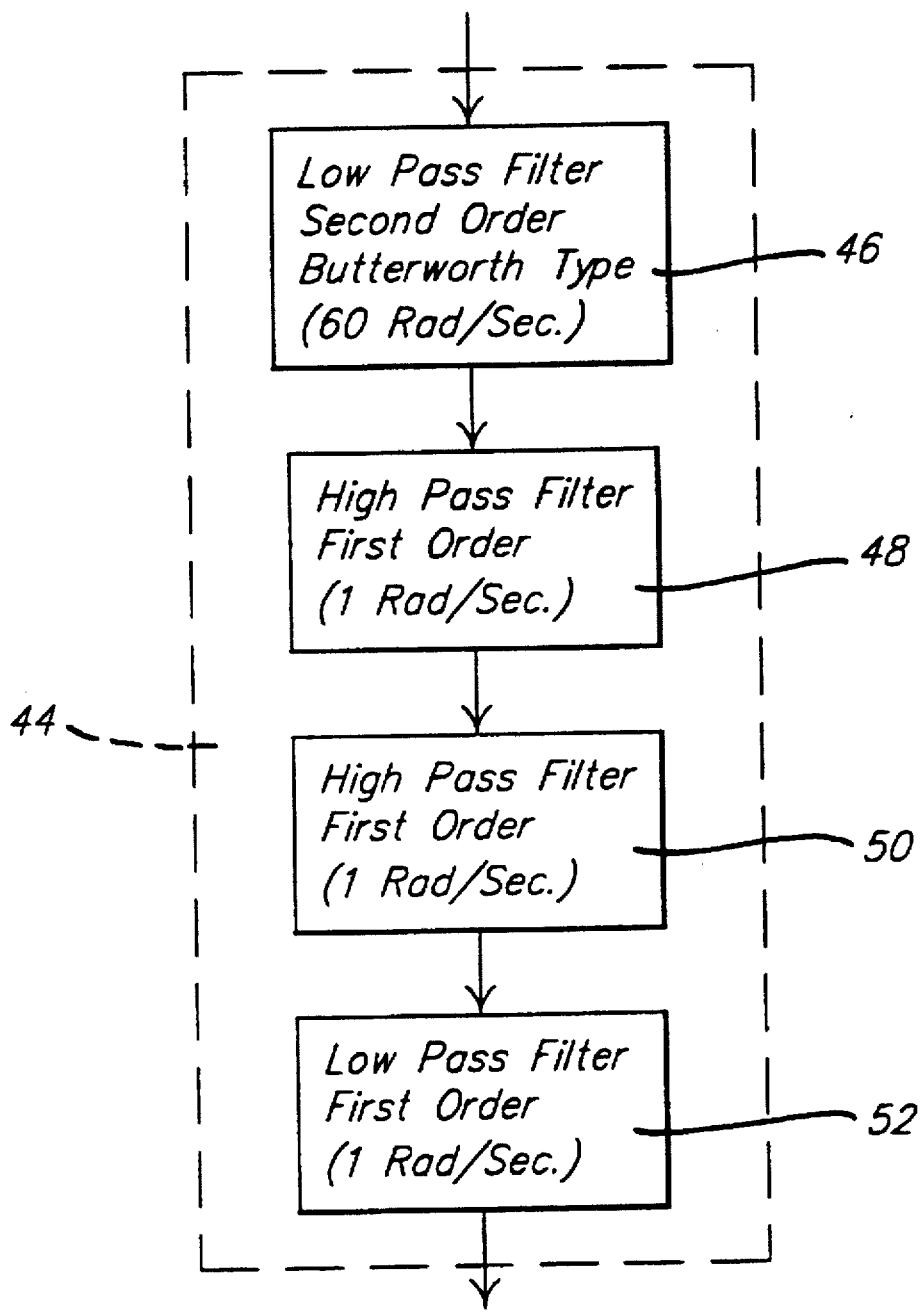
FIG. 3 is a schematic representation of the filter chain integrator shown in FIG. 2 according to the teachings of the preferred embodiment of the present invention.

The signal compensation unit 42 will now be described in greater detail. The signal compensation unit 42 includes a filter chain integrator 44 which is used to generate signals representing the vertical velocity of the body 24 of the automotive vehicle 12 at the left-front, right-front and center-rear portions of the body 24 in response to the outputs of the accelerometers 28–32. These signals are represented as V_BODY_LF, V_BODY_RF, and V_BODY_CR, respectively. As shown in FIG. 3, the filter chain integrator 44 includes a low pass filter 46 which receives the output from the accelerometers 28–32. The low pass filter 46 is the second order filter of the Butterworth type and has a cut-off frequency of approximately 60 radians/seconds. The output of the low pass filter 46 is delivered to a first high pass filter 48. The first high pass filter 48 is a first order filter having a cut-off frequency of approximately one radian/second. The output of the first high pass filter 48 is delivered to a second high pass filter 50 which is also a first order filter having a cut-off frequency of approximately one radian/second. As those skilled in the art will appreciate, the first and second high pass filters 48 and 50 function as a second order high pass filter, but are implemented in this manner for purposes of facilitating design of the signal compensation unit 42. The output of the second high pass filter 50 is delivered to a low pass filter 52. The low pass filter 52 is a first order filter having a cut-off frequency of approximately one radian/ second. At the main body vertical resonance frequency, output of the low pass filter 52 approximates the integral of the output of the accelerometers 28–32 so as to produce corresponding velocity components (i.e., V_BODY_LF, V_BODY_RF, and V_BODY_CR).

As described above, the signal compensation unit 42 serves to add and/or subtract a signal corresponding to longitudinal acceleration as well as lateral acceleration of the automotive vehicle 12 to the signals representing the velocity of the automotive vehicle 12. To provide means for generating a signal corresponding to the lateral acceleration of the body 24 of the automotive vehicle 12, the signal compensation unit 42 further includes a high pass filter 54 as well as a lateral scaler 56. The high pass filter 54 is a first order filter having a cut-off frequency of 0.4 Hz. The cut-off frequency is selected to correspond to the internal high pass filter of accelerometer cut-off frequency associated with the accelerometers 28–32. The lateral scaler 56 is used to scale the output of the high pass filter 54 to generate a signal of magnitude which is able to most effectively adjust the signal corresponding to the velocity of the body 24 of the automotive vehicle 12. The output of the lateral scaler 56 is subtracted from the V_BODY_RF signal of the filter chain integrator 44 by the adder 58 while the output of the lateral scaler 56 is added to the V_BODY_LF signal of the filter chain integrator by the adder 60.

To determine the longitudinal acceleration of the automotive vehicle 12, the signal compensation unit 42 further includes a longitudinal deceleration algorithm 62. The longitudinal deceleration algorithm 62 receives the output of the longitudinal speed sensor 34 of the automotive vehicle 12 and measures the time between the pulses associated with the output of the longitudinal speed sensor 34. By measuring the change in the time between pulses, the longitudinal deceleration algorithm 62 is able to determine whether the automotive vehicle 12 is rapidly decelerating as during braking. As those skilled in the art will appreciate, the longitudinal deceleration algorithm 62 may take the average pulse time between several pulses and determine whether this average pulse time changes. Alternatively, the longitudinal deceleration algorithm 62 may determine whether the time between pulses exceeds a particular limit.

The output of the longitudinal deceleration algorithm 62 is delivered to a high pass filter 64. The high pass filter 64 is a first order filter and has a cut-off frequency of 0.4 Hz. This frequency is selected to match the cut-off frequency of the high pass filter which is associated with the accelerometers 28–32. That is, if the particular accelerometers 28–32 that are used have different cut-off frequencies, the cut-off frequency of the high pass filter 64 will also change so as to have the same cut-off frequency.

The output of the high pass filter 64 is delivered a front/rear scaler 66. The front/rear scaler 66 adjusts the output of the high pass filter 64 by multiplying the output by a particular scaling factor. The magnitude of this scaling factor depends in part upon the position of the accelerometers 28–32 within the automotive vehicle 12 as well as the pitch angle or rate of the automotive vehicle 12. In this regard, the front/rear scaling factor ratio may typically be the ratio between the distance between the center gravity of the automotive vehicle 12 to the rear-center accelerometer 32 divided by the distance between the center gravity of the automotive vehicle 12 to the position of the left-front or right-front accelerometers 28 and 30. For example, the rear scaling factor may be 170 percent that of the front for a 1989 Chrysler Lebaron in which the suspension has been upgraded to a 1990 model. Typically, when the automotive vehicle 12 has softer springs, the scaling factors may be somewhat higher. The output of the front/rear scaler generates two signals as shown in FIG. 2. The signal designated REAR is the output associated with the rear of the automotive vehicle 12, while the signal designated FRONT is the output associated with the front of the automotive vehicle 12.

The FRONT output from the front/rear scaler 66 is added to the output of the filter chain integrator 44 which represents the velocity of the left-front portion of the automotive vehicle (i.e., V_BODY_LF) by the adder 68. In addition, the FRONT output of the front/rear scaler 66 is added to the output of the filter chain integrator 44 representing the velocity of the right-front portion of the automotive vehicle 12 (i.e., V_BODY_RF) by the adder 70. Finally, the REAR output of the front/rear scaler 66 also is subtracted from the output of the filter chain integrator representing the velocity of the center-rear portion of the automotive vehicle 12 (i.e., V_BODY_CR) by the adder 72.

The outputs of the adders 68–70 are then delivered to a velocity translation algorithm 74. In this regard, the velocity translation algorithm 74 receives the V_BODY_LF signal from the filter chain integrator 44 to which has been added the output of the front/rear scaler 66 as well as the output of the lateral scaler 56. In addition, the velocity translation algorithm 74 also receives the V_BODY_RF signal from the filter chain integrator 44 to which has been added the output from the front/rear scaler 66 as well as from which the output of the lateral scaler 56 has been subtracted. Finally, the velocity translation algorithm 74 also receives the V_BODY_CR signal from the filter chain integrator 44 from which the output of the front/rear scaler 66 has been subtracted.

The velocity translation algorithm 74 then determines the velocity of the center of gravity of the automotive vehicle 12 in terms of heave, pitch and roll components. These components are then scaled by a particular weighting factor. For a 1989 Chrysler Lebaron having a 1990 suspension, these weighting factors are 0.7 for the heave component, 1.0 for the pitch component and 0.9 for the roll component. After the velocity of the center of gravity of the automotive vehicle 12 has been determined in this manner, the velocity translation algorithm 74 then determines the vertical velocity of each of the four corners of the automotive vehicle 12. These four vertical velocity components are represented as VS_BODY_LF, VS_BODY_RF, VS_BODY_LR and VS_BODY_RR. These vertical velocity components are then delivered to the damper control logic unit 40 which determines whether these components exceed their respective threshold values.

To provide means for adjusting the damping characteristics of the automotive vehicle 12 in response to changes in pitch of the automotive vehicle 12, the signal compensation unit 42 further includes a pitch-only control algorithm 76. The pitch-only control algorithm 76 receives the output of the filter chain integrator 44 which represents the velocity of the body 24 of the automotive vehicle 12 at its left-front, right-front and center-rear portions (i.e., V_BODY_LF, V_BODY_RF, and V_BODY_CR). The pitch-only control algorithm 76 then calculates the velocity of the automotive vehicle 12 at its center of gravity in terms of the pitch component. The pitch-only control algorithm 76 then determines the pitch component velocity associated with the left-front, right-front, left-rear and right-rear portions of the automotive vehicle 12. These are represented by the VS_PITCH_LF, VS_PITCH_RF, VS_PITCH_LR and VS_PITCH_RR signals.

To improve the accuracy which the pitch-only control algorithm 76 measures the pitch of the automotive vehicle 12 at the left-front, right-front, left-rear and right-rear portions of the automotive vehicle 12, the signal compensation unit 42 further includes the adders 78–84. The adder 78 is used for adding the FRONT output of the front/rear scaler 66 to the V_PITCH_LF signal from the pitch-only control algorithm 76 while the adder 80 is used for adding the FRONT output of the front/rear scaler 66 to the V_PITCH_RF signal from the pitch-only control algorithm 76. In a similar fashion, the adder 82 is used for subtracting the REAR output of the front/rear scaler 66 from the output of the pitch-only control algorithm 76 which represents the pitch velocity of the left-rear portion of the automotive vehicle 12 (i.e., V_PITCH_LR) while the adder 84 is used for subtracting the REAR output of the front/rear scaler 66 from the output of the pitch-only control algorithm 76 which represents the pitch velocity of the right-rear portion of the automotive vehicle 12 (i.e., V_PITCH_RR). The outputs of the adders 78–82 are then delivered to the damper control logic unit 40. The damper control logic unit 40 is then able to adjust the damping characteristics of the dampers 10 in response to the pitch velocities at the various portions of the automotive vehicle 12. In this regard, the damper control logic unit 40 determines whether the pitch components exceed certain threshold values and then adjusts the damping characteristics accordingly.

To provide means for adjusting the damping characteristics of the automotive vehicle 12 in response to changes in the roll of the automotive vehicle 12, the signal compensation unit 42 further includes the roll-only control algorithm 86. The roll-only control algorithm 86 receives the V_BODY_LF, V_BODY_RF and V_BODY_CR signals from the filter chain integrator 44. The roll-only control algorithm 86 then calculates the velocity of the automotive vehicle 12 at its center of gravity in terms of the roll component. After determining the roll component of the velocity of the automotive vehicle 12 at its center of gravity, the roll-only control algorithm 86 generates signals which represent the roll component velocity associated with the left-front, right-front, left-rear and right-rear portions of the automotive vehicle 12. These signals are represented by V_ROLL_LF, V_ROLL_RF, V_ROLL_LR and V-ROLL_RR.

To improve the accuracy with which the roll-only control algorithm 86 measures the roll of the automotive vehicle 12, the signal compensation unit 42 further includes the adders 88–94. The adder 88 is used for adding the output of the lateral scaler 56 of the automotive vehicle 12 to the V_ROLL_LF signal from the roll-only control algorithm 86, while the adder 88 is used for subtracting the output of the lateral scaler 56 from the V_ROLL_RF signal of the roll-only control algorithm 86. In a similar fashion, the adder 92 is used for adding the output of the lateral scaler 56 representing the lateral acceleration of the automotive vehicle 12 to the V_ROLL_LF signal of the roll-only control algorithm 86 while the adder 94 is used for subtracting the output of the lateral scaler 56 from the V_ROLL_RR signal of the roll-only control algorithm 86.

The outputs from the adders 88–94 are delivered to the damper control logic unit 40 so as to allow the damper control logic unit 40 to adjust the damping characteristics of the dampers 10 in response to the roll of the automotive vehicle 12. In this regard, the damper control logic unit 40 may have thresholds above which the roll components of velocity at various portions of the automotive vehicle 12 cause the damping characteristics to change.

The method of the present invention will now be described. The outputs of the left-front accelerometer 28, the right-front accelerometer 30 and the center-rear accelerometer 32 are delivered to the filter chain integrator 44. The filter chain integrator 44 then determines the velocity of the body 24 of the automotive vehicle 12 at its left-front, right-front and center-rear portions (i.e., V_BODY_LF, V_BODY_RF and V_BODY_CR). The lateral acceleration of the automotive vehicle 12 is then determined from the output of the lateral acceleration sensor 36 which is delivered to the high pass filter 54 and the lateral scaler 56. The output from the lateral scaler 56 of the automotive vehicle 12 is then added to the signal representing the vertical velocity of the automotive vehicle 12 at its left-front portion (i.e., V_BODY_LF) by the adder 60 while being subtracted from the signal representing the velocity of the body 24 of the automotive vehicle 12 at its right-front portion (i.e., V_BODY_RF) by the adder 58.

The longitudinal acceleration of the automotive vehicle 12 is then determined. In this regard, the output of the longitudinal speed sensor 34 is delivered to the longitudinal deceleration algorithm 62 which determine the longitudinal deceleration of the automotive vehicle 12. The output from the longitudinal deceleration algorithm 62 is then delivered to a high pass filter 64 as well as the front/rear scaler 66. The output from the front/rear scaler 66 of the automotive vehicle 12 is then added to the velocity of the body 24 of the automotive vehicle 12 at its left-front portion (i.e., V_BODY_LF) by the adder 60 as well as to the velocity of the body 24 of the automotive vehicle 12 at its right-front portion (i.e., V_BODY_RF) by the adder 70. Finally, the output from the front/rear scaler 66 representing the longitudinal acceleration of the automotive vehicle 12 is subtracted from the signal indicative of the velocity of the body 24 of the automotive vehicle 12 at its center-rear portion (i.e., V_BODY_CR) by the adder 72.

The outputs from the adders 68–72 are then delivered to the velocity translation algorithm 74 which determines the velocity of the automotive vehicle 12 at its center of gravity in terms of heave, pitch and roll components. The velocity translation algorithm 74 then determines the vertical components of the body velocity at its left-front, right-front, left-rear and right-rear portions of the automotive vehicle 12. These signals are then delivered to the damper control logic unit 40 which compares these signals to various thresholds and adjusts the damping characteristics of the dampers 10 accordingly.

The method for adjusting the damping characteristics of the dampers according to the pitch of the automotive vehicle will now be described. In a manner similar to that described above, the outputs from the left-front accelerometer 28, the right-front accelerometer 30 and the center-rear accelerometer 32 are delivered to the filter chain integrator 44 which determines the velocity at the left-front, right-front and center-rear portions of the automotive vehicle 12. The output of the filter chain integrator 44 is delivered to the pitch-only control algorithm 76. The pitch-only control algorithm 76 determines the velocity of the body 24 of the automotive vehicle 12 at its center of gravity in terms of the pitch component. After this determination is made, the pitch-only control algorithm 76 determines the pitch components of the velocity of the body 24 at the left-front, right-front, left-rear and right-rear portions of the automotive vehicle 12. The signal compensation unit 42 then determines the longitudinal acceleration of the automotive vehicle 12 from the output of the longitudinal speed sensor 34 which is delivered to the longitudinal deceleration algorithm 62, the high pass filter 64, and the front/rear scaler 66. The output of the front/rear scaler 66 representing the longitudinal acceleration of the automotive vehicle 12 is then added to the V_PITCH_LF signal from the pitch-only control algorithm 76 by the adder 78 while the output of the front/rear scaler 66 is added to the V_PITCH_RF signal from the pitch-only control algorithm 76 by the adder 80. Similarly, the output from the front/rear scaler 66 representing the longitudinal acceleration of the automotive vehicle 12 is subtracted from the V_PITCH_LR and V_PITCH_RR signals from the pitch-only control algorithm 76 by the adders 82 and 84. The output from the adders 78-84 is then delivered to the damper control logic unit 40 which then is able to adjust the damping characteristics of the dampers 10 by determining whether the outputs from the adders 78-84 exceed certain thresholds.

The method for adjusting the damping characteristics of the dampers according to the roll of the automotive vehicle 12 will now be described. In a manner similar to that described above, the outputs from the left-front accelerometer 28, the right-front accelerometer 30 and the center-rear accelerometer 32 are delivered to the filter chain integrator 44 which determines the velocity at the left-front, right-front and center-rear portions of the automotive vehicle 12. The output of the filter chain integrator 44 is delivered to the roll-only control algorithm 86. The roll-only control algorithm 86 then determines the velocity of the body 24 of the automotive vehicle 12 at its center of gravity in terms of the roll component. After this determination is made, the roll-only control algorithm 86 determines the roll components of the velocity of the body 24 at the left-front, right-front, left-rear and right-rear portions of the automotive vehicle 12. The signal compensation unit 42 determines the lateral acceleration of the automotive vehicle 12 from the output of the lateral acceleration sensor 36 which is delivered to the high pass filter 54 and to the lateral scaler 56. The output of the lateral scaler 56 representing the lateral acceleration of the automotive vehicle 12 is then added to the V_ROLL_ LF signal from the roll-only control algorithm 86 by the adder 88 while the output of the front/rear scaler 56 is subtracted from the V_ROLL_RF signal from the roll-only control algorithm 86 by the adder 90. Similarly, the output from the lateral scaler 56 representing the lateral acceleration of the automotive vehicle 12 is added from the V_ROLL_LR signal and subtracted from the V_ROLL_ RR signal from the roll-only control algorithm 86 by the adders 92 and 94. The output from the adders 88-94 is then delivered to the damper control logic unit 40 which then is able to adjust the damping characteristics of the dampers 10 by determining whether the outputs from the adders 88-94 exceed certain thresholds.

It should be understood that the present invention was described in connection with one specific embodiment. It will be appreciated that whether an adder is used for addition or subtraction of signals will depend on the specific orientation of the sensors. Other means may be used for determining the longitudinal acceleration of the automotive vehicle such as a longitudinal accelerometer. Modifications will become apparent to one skilled in the art upon a study of the specification, drawings, and the claims.

What is claimed is:

1. An adjustable damping system for an automotive vehicle comprising:

a plurality of dampers;

a plurality of vertical acceleration sensors for sensing vertical movement of the vehicle at least at three points of said vehicle and generating a plurality of vertical acceleration signals;

a longitudinal speed sensor circuit for generating a filtered longitudinal speed signal indicative of the longitudinal speed of the vehicle;

a lateral acceleration sensor circuit for generating a filtered lateral acceleration signal indicative of the lateral acceleration of the vehicle;

a signal compensation system comprising:

a filter chain integrator for receiving said vertical acceleration signals from said vertical acceleration sensors and generating a first plurality of signals indicative of the vertical movement of said automotive vehicle at said at least three points;

a pitch-only system responsive to said filter chain integrator for determining a pitch component of each of said first plurality of signals and generating a plurality of pitch signals;

a roll-only system responsive to said filter chain integrator for determining a roll component of each of said first plurality of signals and generating a plurality of roll signals;

a first plurality of adders for adding and subtracting said plurality of pitch signals with said first plurality of signals from said filter chain integrator and with said filtered longitudinal speed signal to produce a plurality of compensated pitch signals;

a second plurality of adders for adding and subtracting said plurality of roll signals with said first plurality of signals from said filter chain integrator and with said filtered lateral acceleration signal to produce a plurality of compensated roll signals;

a third plurality of adders for adding and subtracting said first plurality of signals from said filter chain integrator with said plurality of compensated pitch signals and said plurality of compensated roll signals to produce a plurality of first compensated vertical movement signals;

a velocity translation system for receiving said first compensated vertical movement signals and generating a plurality of second compensated vertical movement signals indicative of the vertical velocity of the vehicle at four points of the vehicle; and a damper control system responsive to said compensated pitch signals, said compensated roll signals and said second compensated vertical movement signals for comparing said compensated pitch, compensated roll and second compensated vertical movement signals with predetermined threshold values and generating a plurality of damping signals for controlling said dampers.

* * * * *